United States Patent
Burney

(10) Patent No.: US 11,828,030 B2
(45) Date of Patent: Nov. 28, 2023

(54) ROAD DEBRIS COLLECTION ASSEMBLY

(71) Applicant: Charles Burney, Decatur, GA (US)

(72) Inventor: Charles Burney, Decatur, GA (US)

(*) Notice: Subject to any disclaimer, the term of this patent is extended or adjusted under 35 U.S.C. 154(b) by 764 days.

(21) Appl. No.: 16/930,431

(22) Filed: Jul. 16, 2020

(65) Prior Publication Data
US 2022/0018075 A1   Jan. 20, 2022

(51) Int. Cl.
| *E01H 1/08* | (2006.01) |
| *B02C 23/24* | (2006.01) |
| *B02C 21/02* | (2006.01) |
| *B60K 25/00* | (2006.01) |

(52) U.S. Cl.
CPC ......... *E01H 1/0836* (2013.01); *B02C 21/026* (2013.01); *B02C 23/24* (2013.01); *B60K 25/00* (2013.01); *B02C 2021/023* (2013.01); *E01H 2001/0881* (2013.01)

(58) Field of Classification Search
CPC .......... E01H 1/0836; E01H 2001/0881; B02C 21/026; B02C 23/24; B02C 2021/023; B60K 25/00; B60K 2025/005
See application file for complete search history.

(56) References Cited

U.S. PATENT DOCUMENTS

| 3,649,981 A | 3/1972 | Woodworth |
| D281,109 S | 10/1985 | van Raaij |
| 5,361,441 A | 11/1994 | Williamson |
| 5,596,784 A | 1/1997 | Tolmachoff |
| 5,850,656 A | 12/1998 | Smith |
| 8,840,353 B2 | 9/2014 | Hopkins |
| 2019/0163340 A1* | 5/2019 | Brodbeck ............. G06F 3/0416 |

FOREIGN PATENT DOCUMENTS

| WO | WO2012171101 | * 12/2012 |
| WO | WO2018191621 | 10/2018 |

* cited by examiner

*Primary Examiner* — David Redding

(57) ABSTRACT

A road debris collection assembly for includes a vehicle that has a storage tank thereon and an engine. A vacuum unit is coupled to the storage tank and the vacuum unit produces vacuum pressure within the storage tank when the vacuum unit is turned on. A pair of shredding units is each coupled to the vehicle and each of the shredding units has an inlet is aligned with a roadway upon which the vehicle is driving. Moreover, each of the shredding units is in fluid communication with the vacuum unit to suctionally collect debris from the roadway. Each of the shredding units has a plurality of blades therein and the blades in each of the shredding units shredding the debris when the shredding units are turned on.

8 Claims, 3 Drawing Sheets

US 11,828,030 B2

ROAD DEBRIS COLLECTION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to debris collection devices and more particularly pertains to a new debris collection device for collecting debris on a roadway.

(2) Description of Related Art Including Information Disclosed Under 37 CFR 1.97 and 1.98

The prior art relates to debris collection devices and the prior art discloses a three wheeled road sweeper assembly that includes lifter wheels for climbing curbs and other obstacles. The prior art disclose a street sweeper for towing behind a vehicle. The prior art also disclose a debris collection vehicle that includes a conveyor belt that deposits debris into a storage bin. Additionally, the prior art discloses a refuse collection vehicle that includes a conveyor and a rotating brush for depositing debris on the conveyor for collection. The prior art further discloses a collection bin that is mountable to a front end of a vehicle.

BRIEF SUMMARY OF THE INVENTION

An embodiment of the disclosure meets the needs presented above by generally comprising a vehicle that has a storage tank thereon and an engine. A vacuum unit is coupled to the storage tank and the vacuum unit produces vacuum pressure within the storage tank when the vacuum unit is turned on. A pair of shredding units is each coupled to the vehicle and each of the shredding units has an inlet is aligned with a roadway upon which the vehicle is driving. Moreover, each of the shredding units is in fluid communication with the vacuum unit to suctionally collect debris from the roadway. Each of the shredding units has a plurality of blades therein and the blades in each of the shredding units shredding the debris when the shredding units are turned on.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
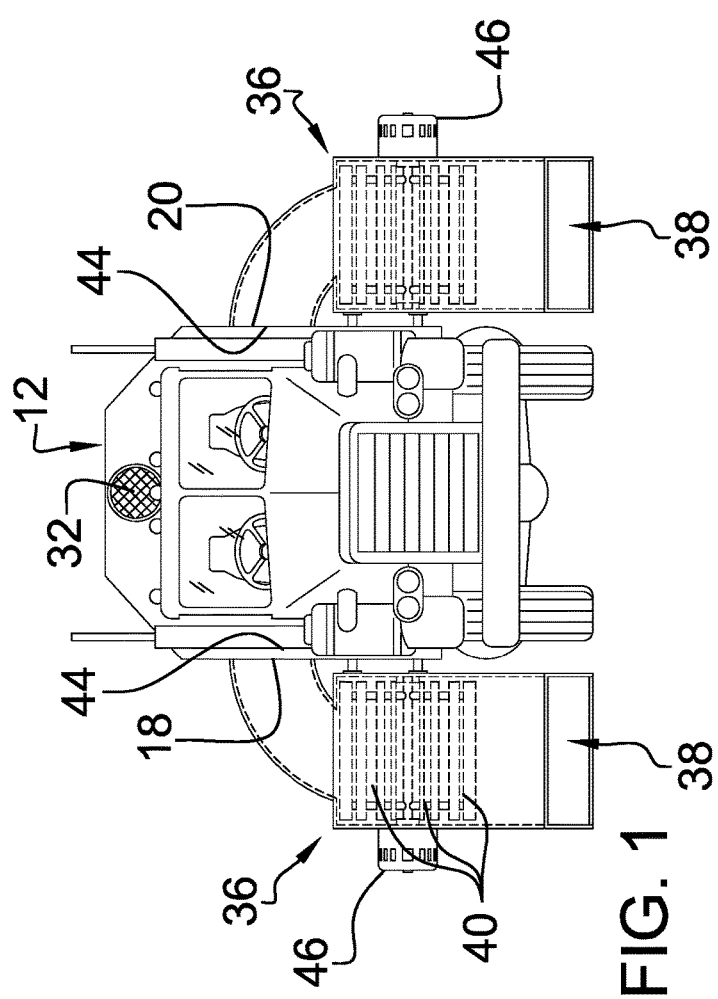
FIG. 1 is a front view of a road debris collection assembly according to an embodiment of the disclosure.
Figure 2:
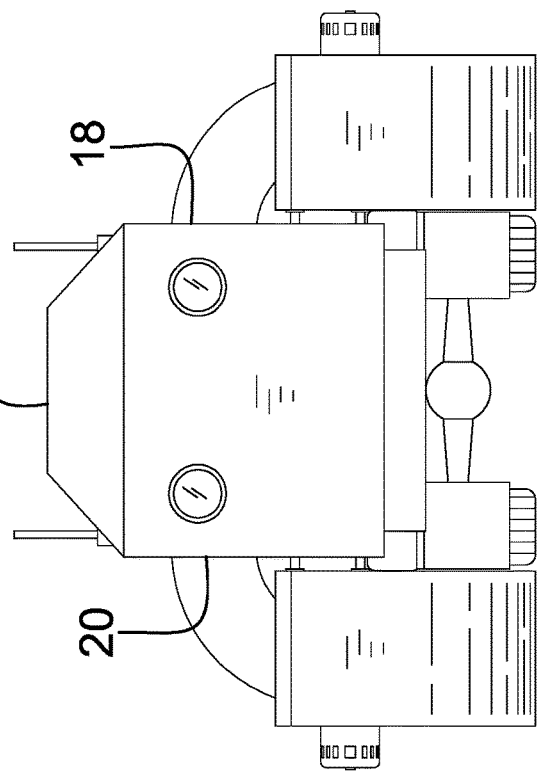
FIG. 2 is a back view of an embodiment of the disclosure.
Figure 3:
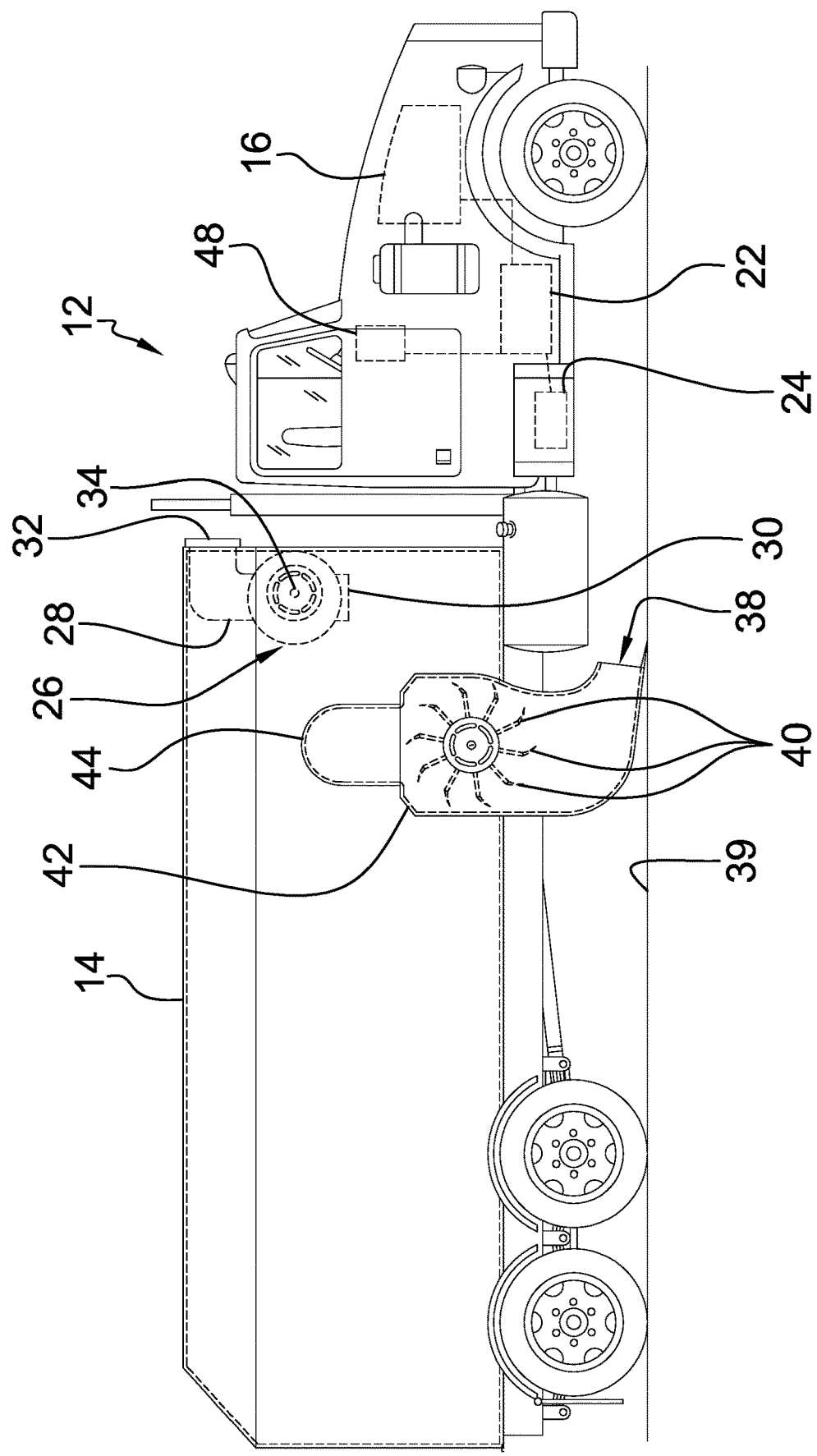
FIG. 3 is a right side phantom view of an embodiment of the disclosure.
Figure 4:
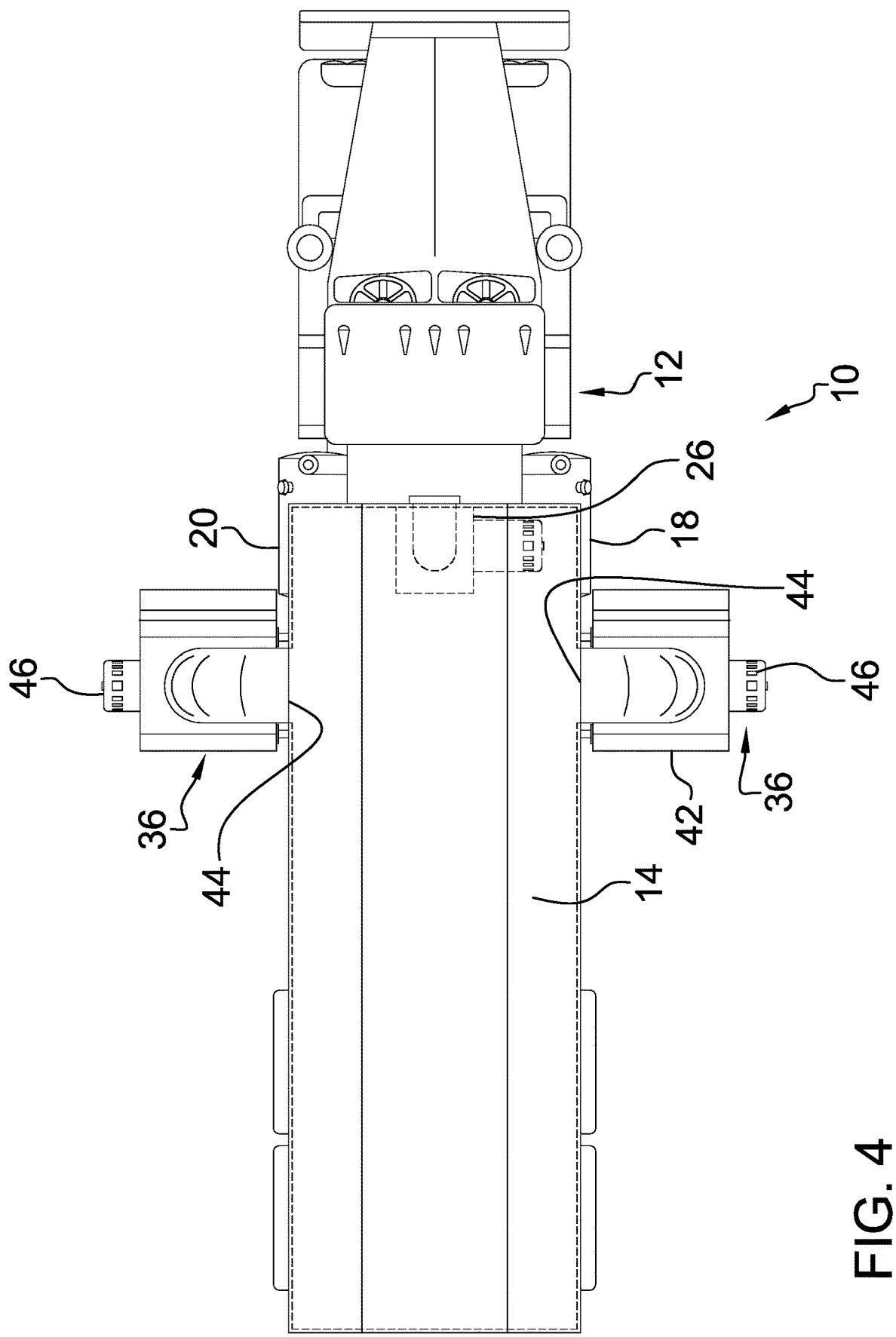
FIG. 4 is a top view of an embodiment of the disclosure.

With reference now to the drawings, and in particular to FIGS. 1 through 4 thereof, a new debris collection device embodying the principles and concepts of an embodiment of the disclosure and generally designated by the reference numeral 10 will be described.

As best illustrated in FIGS. 1 through 4, the road debris collection assembly 10 generally comprises a vehicle 12 that has a storage tank 14 thereon and an engine 16. The storage tank 14 has a first lateral side 18 and a second lateral side 20, and the vehicle 12 may be a truck with at least a 5.0 ton suspension. Additionally, the engine 16 may be a diesel engine. A generator 22 is coupled to the vehicle 12 and the generator 22 is in mechanical communication with the engine 16 such that the engine 16 drives the generator 22 for producing electrical energy. The generator 22 may be a D/C generator 22 or the like. A battery 24 is coupled to the vehicle 12 and the battery 24 is electrically coupled to the generator 22 for receiving the electrical energy. Moreover, the battery 24 is independent from a battery of an ignition system of the vehicle 12.

A vacuum unit 26 is provided and the vacuum unit 26 is coupled to the storage tank 14. The vacuum unit 26 produces vacuum pressure within the storage tank 14 when the vacuum unit 26 is turned on. The vacuum unit 26 comprises a vacuum housing 28 that has an intake 30 and an exhaust 32. The vacuum housing 28 is positioned within the storage tank 14 and the intake 30 is positioned within the storage tank 14 such that the intake 30 is in fluid communication with an interior of the storage tank 14. Moreover, the exhaust 32 extends outwardly through the storage tank 14 such that the exhaust 32 is in fluid communication with ambient air.

The vacuum unit 26 includes a vacuum 34 that is positioned within the vacuum housing 28. The vacuum 34 urges air inwardly through the intake 30 and outwardly through the exhaust 32 when the vacuum 34 is turned on. In this way vacuum pressure is produced within the storage tank 14. The vacuum 34 is electrically coupled to the battery 24 and the vacuum 34 may be an electric vacuum that includes a motor 46 and a fan.

A pair of shredding units 36 is provided and each of the shredding units 36 is coupled to the vehicle 12. Each of the shredding units 36 has an inlet 38 that is aligned with a roadway 39 upon which the vehicle 12 is driving. Moreover, each of the shredding units 36 is in fluid communication with the vacuum unit 26. In this way the inlet 38 of each of the shredding units 36 can suctionally collect debris from the roadway 39. Each of the shredding units 36 has a plurality of blades 40 therein and the blades 40 in each of the shredding units 36 shreds the debris when the shredding units 36 are turned on. Each of the shredding units 36 is mounted to a respective one of the first lateral side 18 and the second lateral side 20 of the storage tank 14.

Each of the shredding units 36 comprises a shredding housing 42 that has the inlet 38 and an output 44. The output 44 extends through an outer wall 46 of the storage tank 14 such that the output 44 is in fluid communication with the intake 30 of the vacuum housing 28. The vacuum 34 urges air inwardly through the inlet 38 of the shredding housing 42 and outwardly through the output 44 of the shredding housing 42 when the vacuum 34 is turned on. Each of the shredding units 36 includes a motor 46 that is coupled to the shredding housing 42. The motor 46 rotates in a first direction when the motor 46 is turned on and each of the blades 40 of a respective one of the shredding units 36 is coupled to the motor 46. The motor 46 rotates each of the blades 40 of the respective shredding unit 36 for shredding the debris passing through the shredding housing 42. The motor 46 may comprise an electric motor or the like and the plurality of blades 40 may be shredder blades of any conventional design.

A control panel 48 is positioned within a cab of the vehicle 12 such that the control panel 48 is accessible to a driver of the vehicle 12. The control panel 48 is in electrical communication with the vacuum unit 26 and each of the shredding units 36 to turn the vacuum unit 26 and each of the shredding units 36 on and off. The control panel 48 is electrically coupled to the battery 24, the vacuum 34 and the motor 46 in each of the shredding units 36. Additionally, the control panel 48 may include a shredder button for turning each of the shredding units 36 on and off. The control panel 48 may also include a vacuum button for turning the vacuum unit 26 on and off.

In use, the vehicle 12 is driven along the roadway 39 to collect debris lying on the roadway 39. The vacuum unit 26 is turned on for suctionally urge the debris into the shredding units 36 for depositing in the storage tank 14. Each of the shredding units 36 can be turned on to shred the debris is the debris comprises large pieces or objects. In this way debris can be collected from the roadway 39 to clean the roadway 39 and to protect traffic from being damaged by the debris. The storage tank 14 can be emptied in a landfill or the like once the storage tank 14 becomes full.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A road debris collection assembly for vacuuming debris from a roadway and shredding the debris, said assembly comprising:
   a vehicle having a storage tank thereon and an engine;
   a vacuum unit being coupled to said storage tank, said vacuum unit producing vacuum pressure within said storage tank when said vacuum unit is turned on;
   a pair of shredding units, each of said shredding units being coupled to said vehicle, each of said shredding units having an inlet being aligned with a roadway upon which said vehicle is driving, each of said shredding units being in fluid communication with said vacuum unit wherein said inlet of each of said shredding units is configured to suctionally collect debris from the roadway, each of said shredding units having a plurality of blades therein, said blades in each of said shredding units shredding the debris when said shredding units are turned on;
   a control panel being positioned within a cab of said vehicle wherein said control panel is configured to be accessible to a driver of said vehicle, said control panel being in electrical communication with said vacuum unit and each of said shredder units to turn said vacuum unit and each of said shredder units on and off;
   said storage tank has a first lateral side and a second lateral side; and
      each of said shredding units is mounted to a respective one of said first lateral side and said second lateral side of said storage tank.

2. The assembly according to claim 1, further comprising:
   a generator being coupled to said vehicle, said generator being in mechanical communication with said engine such that said engine drives said generator for producing electrical energy; and
   a battery being coupled to said vehicle, said battery being electrically co said generator for receiving the electrical energy.

3. The assembly according to claim 1, wherein said vacuum unit comprises a vacuum housing having an intake and an exhaust, said vacuum housing being positioned within said storage tank, said intake being positioned within said storage tank such that said intake is in fluid communication with an interior of said storage tank, said exhaust extending outwardly through said storage tank such that said exhaust is in fluid communication with ambient air.

4. The assembly according to claim 3, wherein said vacuum unit includes a vacuum being positioned within said vacuum housing, said vacuum urging air inwardly through said intake and outwardly through said exhaust when said vacuum is turned on for producing vacuum pressure within said storage tank.

5. A road debris collection assembly for vacuuming debris from a roadway and shredding the debris, said assembly comprising:
- a vehicle having a storage tank thereon and an engine;
- a vacuum unit being coupled to said storage tank, said vacuum unit producing vacuum pressure within said storage tank when said vacuum unit is turned on;
- a pair of shredding units, each of said shredding units being coupled to said vehicle, each of said shredding units having an inlet being aligned with a roadway upon which said vehicle is driving each of said shredding units being in fluid communication with said vacuum unit wherein said inlet of each of said shredding units is configured to suctionally collect debris from the roadway, each of said shredding units having a plurality of blades therein, said blades in each of said shredding units shredding the debris when said shredding units are turned on;
- a control panel being positioned within a cab of said vehicle wherein said control panel is configured to be accessible to a driver of said vehicle, said control panel being in electrical communication with said vacuum unit and each of said shredder units to turn said vacuum unit and each of said shredder units on and off;
- wherein said vacuum unit comprises a vacuum housing having an intake and an exhaust, said vacuum housing being positioned within said storage tank, said intake being positioned within said storage tank such that said intake is in fluid communication with an interior of said storage tank, said exhaust extending outwardly through said storage tank such that said exhaust is in fluid communication with ambient air;
- wherein said vacuum unit includes a vacuum being positioned within said vacuum housing, said vacuum urging air inwardly through said intake and outwardly through said exhaust when said vacuum is turned on for producing vacuum pressure within said storage tank; and
- wherein each of said shredding units comprises a shredding housing having said inlet and an output, said output extending through an outer wall of said storage tank such that said output is in fluid communication with said intake of said vacuum housing, said vacuum urging air inwardly through said inlet of said shredding housing and outwardly through said output of said shredding housing when said vacuum is turned on.

6. The assembly according to claim 5, further comprising a motor being coupled to said shredding housing, said motor rotating in a first direction when said motor is turned on, each of said blades of a respective one of said shredding units being coupled to said motor, said motor rotating each of said blades of said respective shredding unit for shredding the debris passing through said shredding housing.

7. The assembly according to claim 6, wherein:
- said assembly includes a battery being coupled to said vehicle; and
- said control panel being electrically coupled to said battery, said control panel being electrically coupled to said vacuum and said motor in each of said shredding units.

8. A road debris collection assembly for vacuuming debris from a roadway and shredding the debris, said assembly comprising:
- a vehicle having a storage tank thereon and an engine, said storage tank having a first lateral side and a second lateral side;
- a generator being coupled to said vehicle, said generator being in mechanical communication with said engine such that said engine drives said generator for producing electrical energy;
- a battery being coupled to said vehicle, said battery being electrically coupled to said generator for receiving the electrical energy;
- a vacuum unit being coupled to said storage tank, said vacuum unit producing vacuum pressure within said storage tank when said vacuum unit is turned on, said vacuum unit comprising:
  - a vacuum housing having an intake and an exhaust, said vacuum housing being positioned within said storage tank, said intake being positioned within said storage tank such that said intake is in fluid communication with an interior of said storage tank, said exhaust extending outwardly through said storage tank such that said exhaust is in fluid communication with ambient air; and
  - a vacuum being positioned within said vacuum housing, said vacuum urging air inwardly through said intake and outwardly through said exhaust when said vacuum is turned on for producing vacuum pressure within said storage tank, said vacuum being electrically coupled to said battery; and
- a pair of shredding units, each of said shredding units being coupled to said vehicle, each of said shredding units having an inlet being aligned with a roadway upon which said vehicle is driving, each of said shredding units being in fluid communication with said vacuum unit wherein said inlet of each of said shredding units is configured to suctionally collect debris from the roadway, each of said shredding units having a plurality of blades therein, said blades in each of said shredding units shredding the debris when said shredding units are turned on, each of said shredding units being mounted to a respective one of said first lateral side and said second lateral side of said storage tank, each of said shredding units comprising:
  - a shredding housing having said inlet and an output, said output extending through an outer wall of said storage tank such that said output is in fluid communication with said intake of said vacuum housing, said vacuum urging air inwardly through said inlet of said shredding housing and outwardly through said output of said shredding housing when said vacuum is turned on; and
  - a motor being coupled to said shredding housing, said motor rotating in a first direction when said motor is turned on, each of said blades of a respective one of said shredding units being coupled to said motor, said motor rotating each of said blades of said respective shredding unit for shredding the debris passing through said shredding housing; and
  - a control panel being positioned within a cab of said vehicle wherein said control panel is configured to be accessible to a driver of said vehicle, said control panel being in electrical communication with said vacuum unit and each of said shredder units to turn said vacuum unit and each of said shredder units on and off, said control panel being electrically coupled to said battery, said control panel being electrically coupled to said vacuum and said motor in each of said shredding units.

* * * * *